(No Model.)
E. A. TAFT.
HOSE TRUCK.
No. 320,015. Patented June 16, 1885.
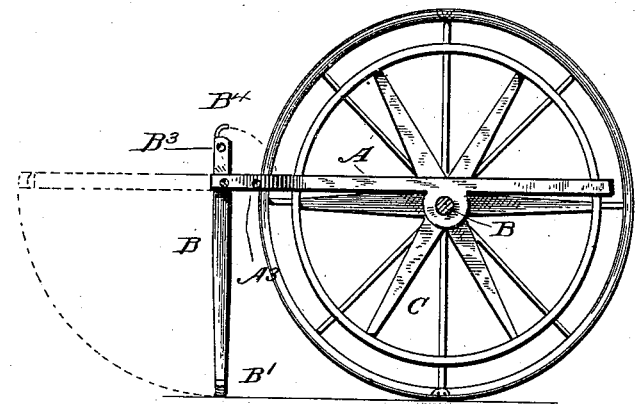
Fig. 1.
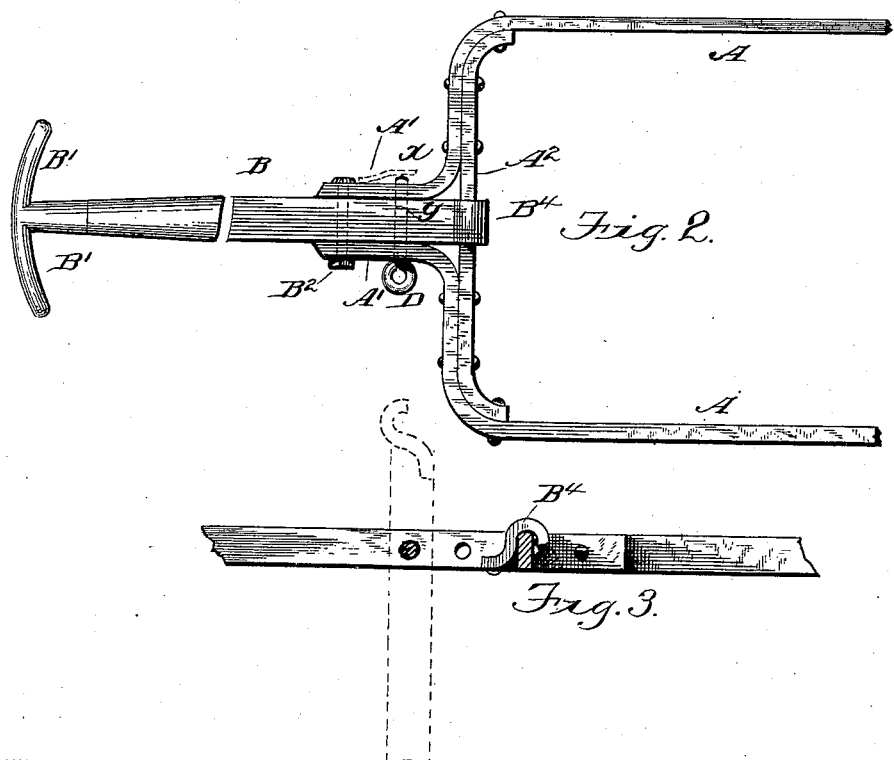
Fig. 2.
Fig. 3.
WITNESSES
Wm S. Duvall
L. C. Hills
INVENTOR
Edward A. Taft
By E. B. Stocking
Atty

UNITED STATES PATENT OFFICE.

EDWARD A. TAFT, OF DAVENPORT, IOWA.

HOSE-TRUCK.

SPECIFICATION forming part of Letters Patent No. 320,015, dated June 16, 1885.

Application filed April 9, 1885. (No model.)

*To all whom it may concern:*

Be it known that I, EDWARD A. TAFT, a citizen of the United States, residing at Davenport, in the county of Scott and State of Iowa, have invented certain new and useful Improvements in Hose-Trucks, of which the following is a specification, reference being had to the accompanying drawings.

This invention has relation to hose trucks or reels, and has for its object the provision of a handle for the truck which is capable of being folded down to serve as a support to maintain the frame-work in a desired position, and to be at the same time capable of being quickly and easily brought into operative position, and when not in actual use the truck as a whole will occupy materially less space than when not provided with my improvement.

The invention consists in certain features of construction hereinafter described, and specifically set forth in the claims.

Referring to the drawings, Figure 1 is a side elevation of a truck embodying my improvement, one wheel thereof being removed and the handle being folded down. Fig. 2 is a plan of the frame-work with the handle in operative position. Fig. 3 is a substantially central vertical section of Fig. 2, and embodies a modification hereinafter described.

Like letters indicate like parts in all the figures.

A represents the bail-like frame-work of the truck, which is mounted upon an axle, B, which carries the reel C. The frame-work is extended to the front in the form of arms or brackets A', and comprises a tie-bar, $A^2$, secured by bolts, rivets, or otherwise to and at the rear faces of the front portion of the frame-work, as clearly indicated in Fig. 2. The handle B, which may be made wholly of iron, or in part of wood, as desired, is provided with a T-end piece, B', the prongs of which may be straight, but for the purpose hereinafter specified are preferably curved, as shown. The handle is pivoted upon a bolt, $B^2$, passing through it and the arms A', and is perforated (as at $B^3$, in rear of its pivot) so as to register with like perforations $A^3$ in the arms, and passing through the same, as clearly indicated in Fig. 2, for the reception of the removable pin or eyebolt D, which may be connected to the frame-work by any suitable cord or chain, so as to be always present for use.

By the construction thus far described it will be seen that the handle can be folded, turned, or swung downwardly, so that its end will rest upon the ground or floor, as clearly shown in Fig. 1, and being proportioned in length for this purpose, it will support the frame-work and reduce the space otherwise occupied by the truck nearly one-half. While in this position the advantage of curving the arms of the T-head of the handle is apparent, in that they are raised above the floor so that they can be readily seized for the purpose of turning the handle to a horizontal position, as indicated in Fig. 1.

Now, by reference to Fig. 2 and the dotted lines X therein, (which represent a modification of the locking device D—that is, a spring secured to one of the brackets of the frame-work, and having a pin or bolt passing through one of the perforations $A^3$, and of sufficient length to reach into the perforation $B^3$ to about the point Y of the handle, said pin or bolt being beveled after the manner of ordinary spring-seated reciprocating latches,) it will be seen that the handle when raised to a horizontal position, as above described, will be automatically locked in its operative or extended position.

To insure a more rigid, safe, and sure retention of the handle in operative position, the pin D is employed, and with it, in order to give greater strength and to relieve the pin from undue strain, I may extend the handle in the form of a hook, $B^4$, made either integral therewith, as shown in Figs. 1 and 2, or separate therefrom and secured thereto in any suitable manner, as illustrated in Fig. 3.

I do not limit my invention to the use of the hook, but may vary the same in any manner and to any extent within the skill of persons conversant in the construction of similiar apparatuses.

Having described my invention and its operation, what I claim is—

1. A hose reel or truck provided with a handle pivoted to the frame-work of the truck, and adapted to fold down to form a support for the truck-frame, substantially as specified.

2. In a hose reel or truck, the combination of a pivoted handle adapted to fold down to form a support for the same, with devices for securing said handle in an elevated operative position, substantially as specified.

3. In a hose reel or truck, the combination of a pivoted handle provided with a hook, with a frame-work adapted to support the pivot and act as a stop for the handle, substantially as specified.

4. The combination of the frame-work A, extended to form arms A', with the handle B, pivot-bolt $B^2$, and locking device D, substantially as shown and described.

5. The combination of the frame-work A, comprising arms A' and a tie-bar, $A^2$, with a handle, B, having hook $B^4$, and a locking-pin, D, substantially as shown and described.

6. The combination with the frame A, and the handle B, pivoted thereto, and provided with the T-head, having the curved arms B', substantially as shown and described.

In testimony whereof I affix my signature in presence of two witnesses.

EDWARD A. TAFT.

Witnesses:
 GEO. A. PIERCE,
 ROBERT MANY.